(12) United States Patent
Ombach et al.

(10) Patent No.: US 9,712,008 B2
(45) Date of Patent: Jul. 18, 2017

(54) PERMANENT MAGNET SYNCHRONOUS MOTOR AND POWER-ASSISTED STEERING SYSTEM

(71) Applicant: Brose Fahrzeugteile GmbH & Co. Kommanditgesellschaft, Wurzburg, Wurzburg (DE)

(72) Inventors: Grzegorz Ombach, Munich (DE); Horst Steegmuller, Wurzburg (DE); Wojciech Chlebosz, Taufkirchen (DE)

(73) Assignee: Brose Fahrzeugteile GmbH & Co. Kommanditsellschaft, Wurzburg, Wurzburg (DE)

( * ) Notice: Subject to any disclaimer, the term of this patent is extended or adjusted under 35 U.S.C. 154(b) by 258 days.

(21) Appl. No.: 14/418,528

(22) PCT Filed: Jul. 11, 2013

(86) PCT No.: PCT/EP2013/002053
§ 371 (c)(1),
(2) Date: Jan. 30, 2015

(87) PCT Pub. No.: WO2014/019641
PCT Pub. Date: Feb. 6, 2014

(65) Prior Publication Data
US 2015/0207370 A1    Jul. 23, 2015

(30) Foreign Application Priority Data

Jul. 31, 2012 (DE) .................. 10 2012 213 465

(51) Int. Cl.
*H02K 1/27*    (2006.01)
*H02K 29/03*   (2006.01)
(Continued)

(52) U.S. Cl.
CPC ............. *H02K 1/2773* (2013.01); *B62D 5/04* (2013.01); *H02K 3/28* (2013.01); *H02K 21/14* (2013.01); *H02K 29/03* (2013.01)

(58) Field of Classification Search
CPC ........ H02K 1/146; H02K 1/22; H02K 1/2746; H02K 1/276; H02K 1/2773; H02K 1/28;
(Continued)

(56) References Cited

U.S. PATENT DOCUMENTS 2,059,518 A * 11/1936 Harley ................. H02K 1/2773
310/156.53
3,564,314 A *  2/1971 Haydon ................. G01R 11/36
310/156.43
(Continued)

FOREIGN PATENT DOCUMENTS

DE    10 2007 029 157 A1    1/2009
DE    10 2009 000 681 A1    8/2010
(Continued)

OTHER PUBLICATIONS

The First Examination Report for Korean Patent Application No. 10-2015-7003817, dated Mar. 17, 2016, 8 pages.
(Continued)

*Primary Examiner* — Tran Nguyen
(74) *Attorney, Agent, or Firm* — Westman, Champlin & Koehler, P.A.

(57) ABSTRACT

The invention relates to a permanent magnet synchronous motor, in particular an electric three phase motor, comprising a stator in which stator teeth with interposed stator grooves are arranged, at least one winding made of an electrically conductive material being provided on each stator tooth, further comprising a rotor with permanent magnets which are arranged radially in a spoke-like manner in the rotor. Said synchronous motor has a predetermined
(Continued)

and defined maximum brake torque based on a predetermined diameter-length-ratio of the rotor, a number of rotor poles and a number of stator grooves. The present invention further relates to an electric power-assisted steering system.

10 Claims, 6 Drawing Sheets

(51) Int. Cl.
*H02K 21/14* (2006.01)
*B62D 5/04* (2006.01)
*H02K 3/28* (2006.01)

(58) Field of Classification Search
CPC ........ H02K 21/14; H02K 21/16; H02K 29/03; B62D 5/04
See application file for complete search history.

(56) References Cited

U.S. PATENT DOCUMENTS

| | | | |
|---|---|---|---|
| 5,010,266 A * | 4/1991 | Uchida | H02K 1/2773 310/156.22 |
| 5,200,662 A * | 4/1993 | Tagami | H02K 1/2773 310/114 |
| 7,157,827 B2 * | 1/2007 | Heideman | H02K 1/2773 310/156.47 |
| 8,673,267 B2 | 3/2014 | Bhatia et al. | |
| 2006/0138894 A1 * | 6/2006 | Harada | H02K 1/28 310/216.004 |
| 2010/0289370 A1 * | 11/2010 | Roth | H02K 1/276 310/156.53 |
| 2012/0043155 A1 * | 2/2012 | Feuerrohr | H02K 1/146 180/443 |

FOREIGN PATENT DOCUMENTS

| | | |
|---|---|---|
| EP | 1 028 047 A2 | 8/2000 |
| EP | 1 677 408 A1 | 7/2006 |
| JP | S63140645 A | 6/1988 |
| JP | 2012-517209 A | 7/2012 |
| WO | 02/060740 A2 | 8/2002 |

OTHER PUBLICATIONS

Mi, Chunting Chris, "Analytical Design of Permanent-Magnet Traction-Drive Motors", IEEE Transactions on Magnetics, vol. 42, No. 7, Jul. 2006, 6 pages.

International Search Report for PCT Application No. PCT/EP2013/002053, dated Dec. 9, 2013, 4 pages.

* cited by examiner

PERMANENT MAGNET SYNCHRONOUS MOTOR AND POWER-ASSISTED STEERING SYSTEM

CROSS-REFERENCE TO RELATED APPLICATION

This Application is a Section 371 National Stage Application of International Application No. PCT/EP2013/002053, filed 11 Jul. 2013 and published as WO 2014/019641 A1 on 6 Feb. 2014, in German, the contents of which are hereby incorporated by reference in their entirety.

FIELD OF THE INVENTION

The present invention relates to a permanent magnet synchronous motor, in particular a three-phase electric motor. The present invention also relates to an electric power-assisted steering system of a motor vehicle.

TECHNICAL BACKGROUND

Permanent magnet synchronous motors of this type are, for example, used in drive devices of motor vehicles, in particular in power-assisted steering systems and the like.

FIG. 1 schematically shows the structure and the mode of functioning of a generally known power-assisted steering system 100 for a motor vehicle. The power-assisted steering system shown there comprises a steering gear 101, a steering shaft 102 with a steering wheel, not designated in more detail, and a servo drive 103 with a control unit 104. A track rod 107 cooperates with the steering gear 101 by means of a pinion 105. The steering gear 101 has a gear rack (only indicated symbolically by a double arrow) here, which is connected to the pinion 105. The pinion 105 is rotatably coupled to the steering wheel by the steering shaft 102. The track rod 107 cooperates with steerable wheels 106 of the motor vehicle.

The servo drive 103 is equipped, for example, with a three-phase electric motor and is attached here with the control unit 104 between the steering wheel and the steering gear 101. The servo drive 103 is used as assistance during steering operations in that it cooperates with the gear rack. The servo drive 103 can be attached on a steering column for this purpose.

A motor currently used as a servo drive 103 may be a brushless motor, for example a permanent magnet synchronous motor or an asynchronous motor. For example, a permanent magnet synchronous motor has a stator with stator grooves, in which windings are arranged, and a rotor with permanent magnets. The permanent magnets are, for example, produced from a rare earth material and arranged in a spoke-like manner in the rotor.

A motor of this type has to satisfy at least the following two main requirements: 1) performance and 2) safety. In relation to the performance, parameters such as, for example, power density, maximum output torque, torque fluctuation or ripple and cogging torque or pulsating torque are important. In the case of safety, the parameter of maximum brake torque is, inter alia, critical at a phase short circuit and, for example, has to be limited to a value of about 0.6 Nm at a complete short circuit of a phase.

WO 2002/060740 A2 and EP 1028047 B1 provide examples or solution proposals for the above problems.

The increased requirements of the use conditions in a motor vehicle, in particular in relation to as small an installation volume as possible, low weight, low number of individual parts used and a simultaneously high efficiency, and the above-mentioned parameters result in the constantly present requirement of providing a correspondingly improved permanent magnet synchronous motor.

SUMMARY OF THE INVENTION

Against this background, the present invention is based on the object of providing an improved permanent magnet synchronous motor.

According to the invention, this object is achieved by a permanent magnet synchronous motor having the features of claim 1 and/or by a power-assisted steering system having the features of claim 10.

Accordingly, there is provided
  a permanent magnet synchronous motor, in particular a three-phase electric motor, with a stator, in which stator teeth with interposed stator grooves are arranged, at least one winding made of an electrically conductive material being provided on each stator tooth, with a rotor with permanent magnets, which are arranged radially in a spoke-like manner in the rotor, wherein the synchronous motor is configured with a predetermined and limited maximum brake torque, based on a predetermined diameter/length ratio of the rotor, a rotor pole number and a number of stator grooves.
  a power-assisted steering arrangement of a motor vehicle has a permanent magnet synchronous motor according to the invention.

The idea on which the present invention is based consists in that a maximum brake torque of the permanent magnet synchronous motor, based on a previously established diameter/length ratio, a rotor pole number and a number of stator grooves, can be established beforehand. A permanent magnet synchronous motor of this type thus has the advantages of a very small cogging torque linked to a high power density and simultaneously low torque ripple and high fault tolerance.

A further advantage is that the permanent magnet synchronous motor according to the invention has, in comparison with conventional permanent magnet synchronous motors, a relatively low brake torque, which may be up to 40% lower.

In comparison with a conventional permanent magnet synchronous motor, the permanent magnet synchronous motor according to the invention also has the following advantages:
  increased performance of about 10%;
  brake torque that is lower by about 40%;
  reduced cogging torque;
  reduced torque ripple;
  no relay necessary;
  a delta connection can be used;
  simple stator construction.

The previously established diameter/length ratio of the rotor designates a quotient of a diameter of the rotor and a length of the rotor. Thus, simple geometric parameters, which are easy to master, are decisive for establishing the maximum brake torque.

The described permanent magnet synchronous motor is preferably suitable for the drive device of a motor vehicle power-assisted steering system. However, other applications in other drive devices, such as, for example, in electric parking brakes, are also conceivable.

Advantageous configurations and developments of the invention emerge from the subordinate claims and from the description viewed together with the figures of the drawings.

The permanent magnet synchronous motor has nine or twelve stator grooves. The rotor pole number of the rotor is preferably six, eight, ten or fourteen. In this case, a conventional standard design of a stator can be used.

It has surprisingly turned out that the previously established diameter/length ratio of the rotor, the rotor pole number and the number of stator grooves are related in accordance with the following table:

| Rotor pole number 210-n | Number of stator grooves 202 | DLV |
|---|---|---|
| 6 | 9 | >1.63 |
| 8 | 12 | >1.55 |
| 10 | 12 | >1.50 |
| 14 | 12 | >1.42 |

The rotor may have at least one rotor packet in a further embodiment, a rotor packet number depending on the rotor length in accordance with the following table:

| Rotor length L (mm) | Rotor packet number 209-n |
|---|---|
| L ≤ 20 | 1 |
| 20 ≤ L ≤ 40 | 1 or 2 |
| 40 ≤ L ≤ 60 | 2 or 3 |
| 60 ≤ L ≤ 100 | 3 or 4 |

Moreover, in the case of a rotor packet number greater than one, the rotor packets may be arranged rotated in relation to one another by an interconnection angle about a rotor axis. In this case, the interconnection angle may depend on the diameter/length ratio of the rotor in accordance with the following table:

| Rotor pole number 210-n | Number of stator grooves 202 | Interconnection angle γ (°) | DLV |
|---|---|---|---|
| 6 | 9 | 9 ± 2 | >1.63 |
| 8 | 12 | 7.5 ± 2 | >1.55 |
| 10 | 12 | 6 ± 2 | >1.50 |
| 14 | 12 | 2 ± 1 | >1.42 |

In a further embodiment, the stator has a three-phase winding in a delta connection. This is advantageous as, on the one hand, a so-called star relay can be dispensed with for separating a phase in the event of a short circuit. On the other hand, manufacturing of the windings is thereby facilitated.

The stator may, however, also have a three-phase winding in a star connection. The star relay for separating a phase in the event of a short circuit may also be dispensed with here.

In a further embodiment, the permanent magnets of the rotor may contain ferrite magnets or/and materials made of rare earths. Because of the diameter/length ratio that can be established beforehand and the other parameters it may be possible here for the permanent magnets to be able to be used in a low power stage, which significantly reduces the costs for the permanent magnet synchronous motors according to the invention.

The above configurations and developments of the invention can be combined with one another in any desired manner.

CONTENTS OF THE DRAWINGS

The present invention will be described in more detail below with the aid of the embodiments disclosed in the schematic figures of the drawings, in which.

Figure 1:
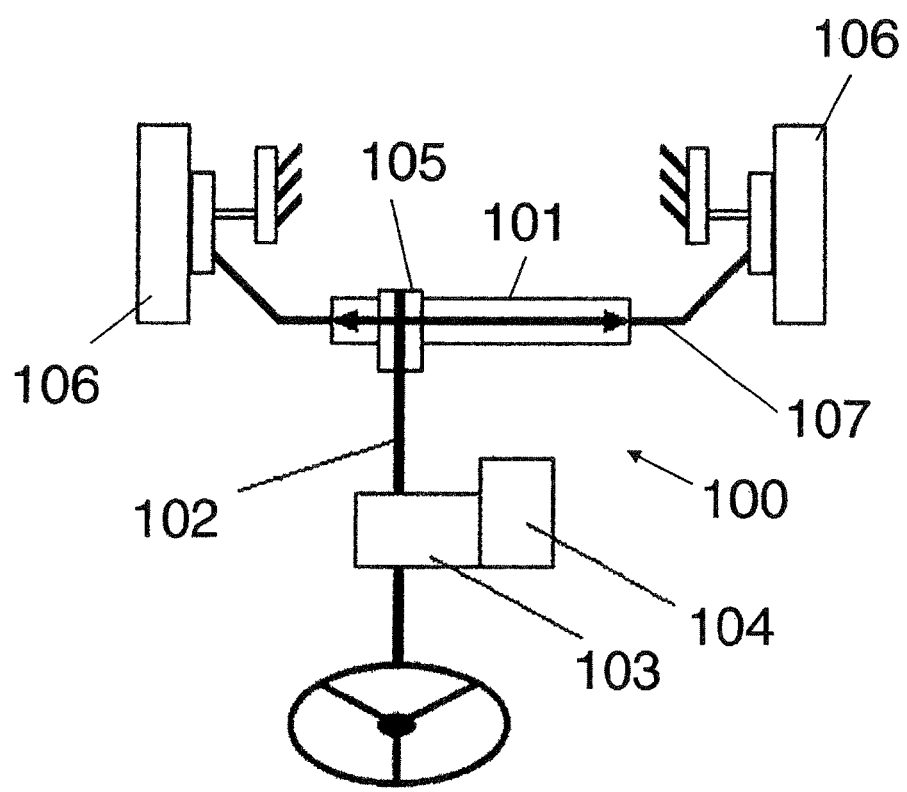
FIG. 1 is a schematic view of a power-assisted steering system according to the prior art.

The accompanying drawings are to convey a further understanding of the embodiments of the invention. They illustrate embodiments and are used in conjunction with the description to explain principles and concepts of the invention. Other embodiments and many of the advantages mentioned emerge in view of the drawings. The elements of the drawings are not necessarily shown true-to-scale in relation to one another.

Elements, features and components that are the same, functionally the same and act the same are in each case provided with the same reference numerals in the figures of the drawings, as long as nothing else is stated.

DESCRIPTION OF EMBODIMENTS

Figure 2:
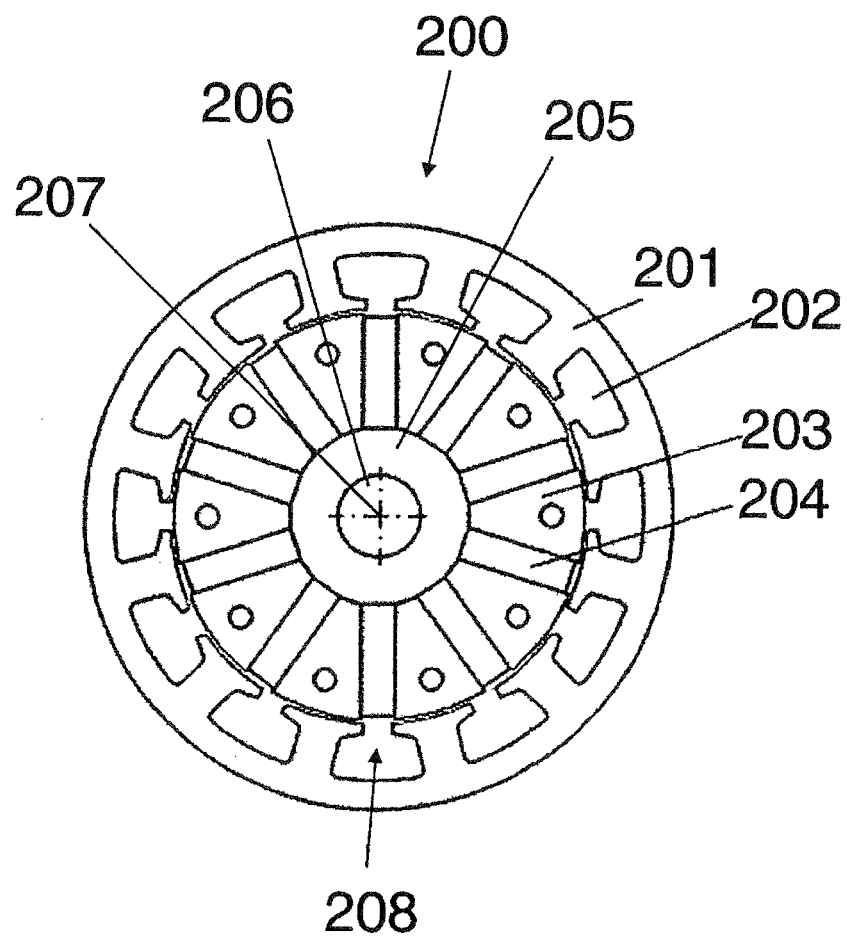
FIG. 2 is a schematic plan view of an embodiment of a permanent magnet synchronous motor according to the invention.

FIG. 2 is a schematic plan view of an embodiment of a permanent magnet synchronous motor 200 according to the invention.

The permanent magnet synchronous motor 200 in FIG. 2 has a stator 201 with stator grooves 202, in which windings (not shown) are arranged, and a rotor 208 with a rotor core 203 and permanent magnets 204, which are arranged here in the radial direction of the electric motor within the rotor 208 in a spoke-like manner between portions of the rotor core 203. The rotor 208 is located within the stator 201. The portions of the rotor core 203 and the permanent magnets 204 are fastened on a rotor body 206, through which a rotor shaft 206 with a rotor axis 207 runs. The rotor shaft 206 with the rotor axis 207 is perpendicular here to the plane of the drawing. The rotor 208 is located within the stator 201 and with the latter has the common rotor axis, i.e. the rotor 208 and stator 201 are coaxial. The permanents magnets 204 are arranged in such a way that like poles always oppose one another, i.e. north poles N oppose north poles N and south poles S oppose south poles S.

The stator 201 is configured with twelve stator grooves 202 and twelve stator poles and may be straight or oblique, i.e. the stator grooves 202 run linearly parallel to the rotor axis 207 or obliquely with respect to the latter. The rotor 208, in contrast, is a ten-pole rotor here, i.e. it has ten permanent magnets 204. The permanent magnets 204 may be ferrite magnets or/and have materials of rare earths, for example.

Figure 3:
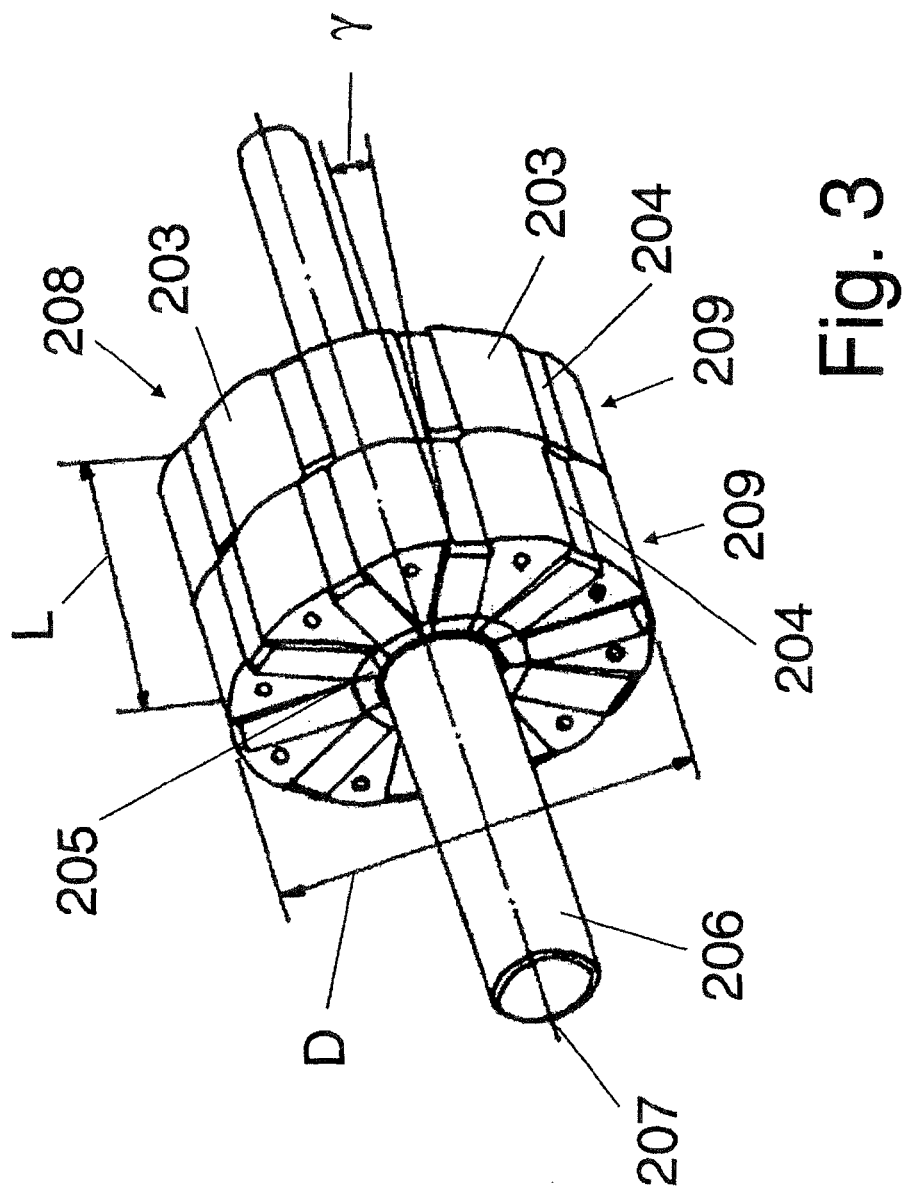
FIG. 3 is a schematic perspective view of a rotor of the permanent magnet synchronous motor according to the invention according to FIG. 2.

FIG. 3 shows a schematic perspective view of an embodiment of the rotor 208 of the permanent magnet synchronous motor 200 according to FIG. 2.

Two rotor packets 209 are attached on the rotor shaft 206 here. The permanent magnets 204 are arranged radially in a spoke-like manner between portions of the respective rotor cores 203. The rotor cores 203 and the permanent magnets 204 are connected in a manner not shown in more detail to the rotor body 205, which is fastened to the rotor shaft 206.

The rotor 208 has an external diameter, which is given as the rotor diameter D. In the longitudinal direction parallel to the rotor axis 207, the rotor has a longitudinal dimension designated the rotor length L. The rotor length L is to be taken to mean the entire length of the rotor packets 209 here in the direction of the rotor axis 207. The two rotor packets 209 are arranged rotated in relation to one another by an interconnection angle γ about the rotor axis 207 on the rotor shaft 206.

It has surprisingly been found that a specific ratio of geometric dimensions of the rotor 208 in combination with the permanent magnets 204, for example as ferrite permanent magnets, and further parameters of the rotor 208 and stator 201 is decisive for limiting a maximum brake torque of the permanent magnet synchronous motor 200. A geometric ratio of this type is a diameter/length ratio DLV between the rotor diameter D and the rotor length L, namely the dimensionless quotient:

$$DLV=D/L \qquad (1)$$

The further parameters are the pole number or number of teeth of the stator, a rotor pole number 210-$n$ (see FIG. 7) of the rotor 208 and the interconnection angle γ of the rotor packets 209 from a rotor packet number 209-$n$ greater than one. This is dealt with in more detail below.

This specific diameter/length ratio DLV with the corresponding boundary conditions based on the further parameters makes possible a permanent magnet synchronous motor 200 with a high power with permanent magnets 204 in a low power stage. Moreover, a small brake torque is produced at a short circuit of a phase.

Figure 4:
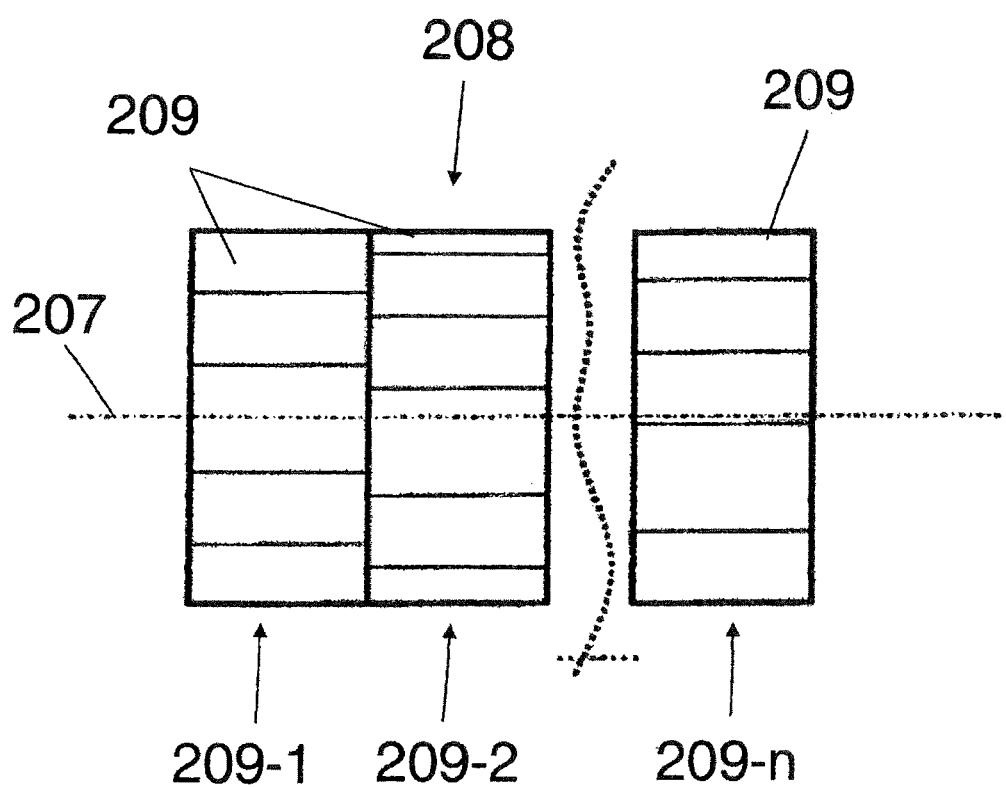
FIG. 4 is a schematic partial side view of the rotor of the permanent magnet synchronous motor according to the invention according to FIG. 2.

FIG. 4 shows a schematic partial side view of the rotor 208 of the permanent magnet synchronous motor 200 according to the invention according to FIG. 2.

The rotor 208 may have a rotor packet 209 or else more than the two rotor packets 209 shown here. A plurality of rotor packets 209 are shown here with a respective rotor packet number 209-1, 209-2 . . . 209-$n$. The rotor packets 209 have the interconnection angle γ in relation to one another and are arranged on the rotor axis 207 in the axial direction of the rotor 208.

Figure 5:
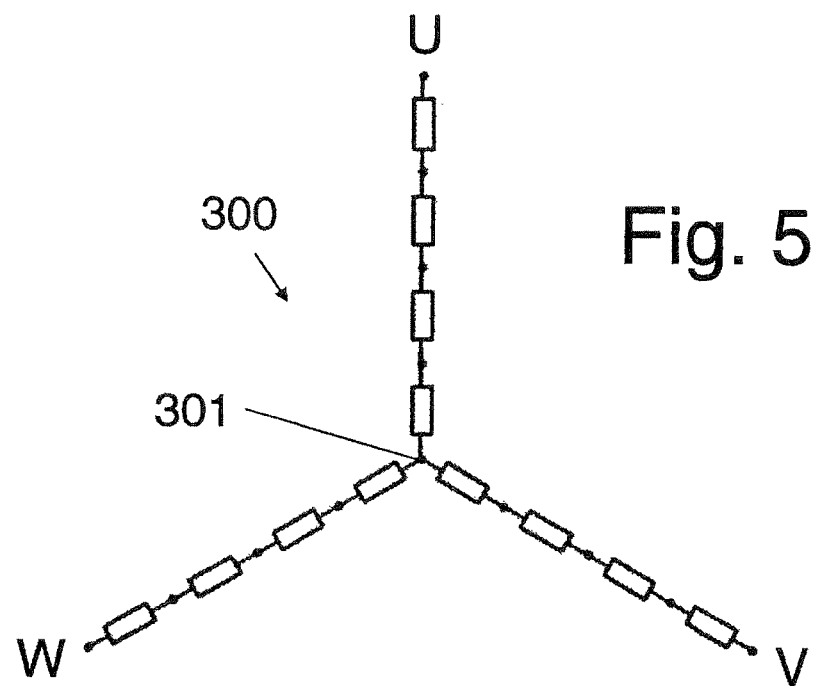
FIGS. 5-6 are circuit diagrams of windings of the permanent magnet synchronous motor according to the invention according to FIG. 2.
Figure 6:
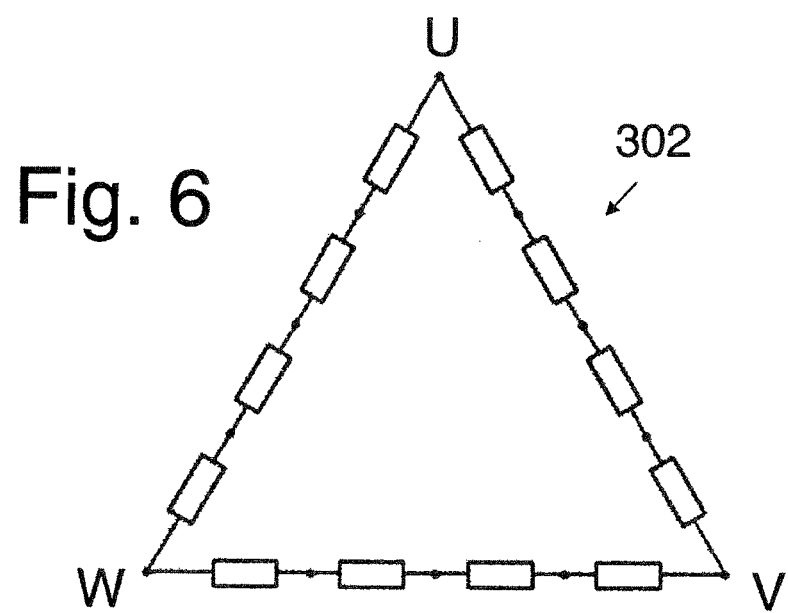

The stator 201 may be configured with two different types of winding. FIGS. 5 and 6 for this purpose are circuit diagrams of windings of the permanent magnet synchronous motor 200 according to the invention according to FIG. 2.

FIG. 5 shows a conventional star connection 300 with terminal points U, V, W and a centre point or star point 301. However, the stator may also be provided with a delta connection 302 according to FIG. 6. The delta connection provides the advantage here that only three terminals U, V, W are necessary as a star terminal 301 or star connecting of the star connection 300 is dispensed with. Moreover, a winding of the delta connection 302 may be simpler in terms of manufacturing depending on the stator 201 or/and may take place more quickly.

In a permanent magnet synchronous motor according to the prior art, in the case of the star connection 300, a star relay (not shown but easily imaginable) is necessary, which, in the event of a short circuit of a phase of the star winding 300 in the star point 301, brings about an interruption of the respective short-circuited phase in order to limit the brake torque in the event of the short circuit or to prevent it. A relay of this type is not necessary in the permanent magnet synchronous motor 200 according to the invention as, because of the special diameter/length ratio DLV with the further parameters, a short circuit of a phase can only cause a limited brake torque of the permanent magnet synchronous motor 200. For this reason, the delta connection 302 according to FIG. 6 can also be implemented as the latter cannot be used without a relay in the prior art or higher outlay with a relay for separating short-circuited phases would be necessary.

Figure 7:
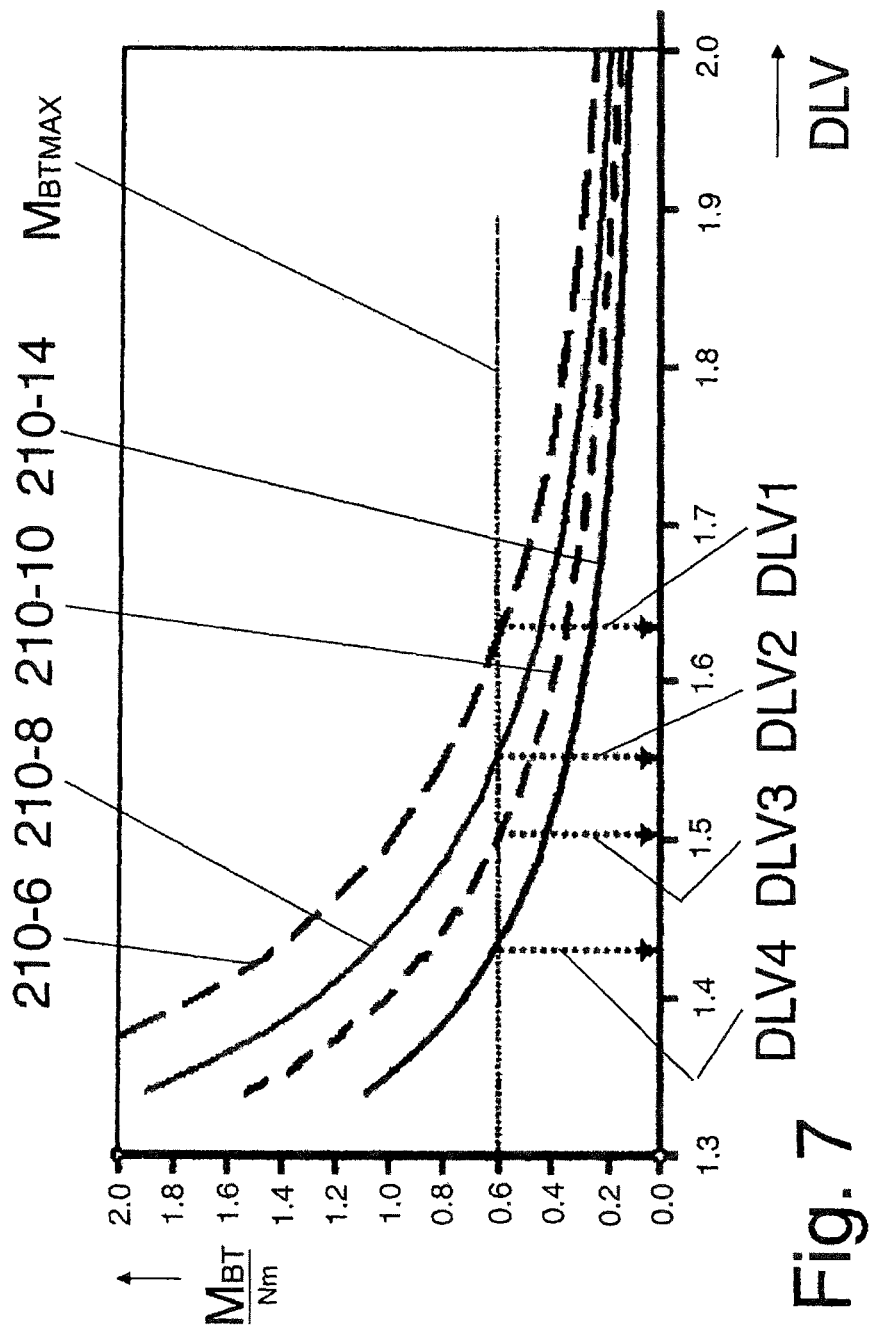
FIG. 7 is a graphic view of a brake torque depending on a diameter/length ratio of rotors of the permanent magnet synchronous motor according to the invention according to FIG. 2.

FIG. 7 is a graphic view of a brake torque of the permanent magnet synchronous motor 200 according to the invention depending on a diameter/length ratio DLV of rotors 208 of the permanent magnet synchronous motor 200 according to the invention according to FIG. 2.

A brake torque $M_{BT}$ in Nm is plotted on the ordinate for a phase of the permanent magnet synchronous motor 200. The abscissa shows values for the diameter/length ratio DLV of rotors 208. A maximum brake torque $M_{BTMAX}$, with a reliable value here of 0.6 Nm, is entered as a dotted line parallel to the abscissa. The maximum brake torque $M_{BTMAX}$ indicates the brake torque, at which a power-assisted steering system, which is equipped with the permanent magnet synchronous motor 200 as the servo motor, is not yet blocked or is still capable of functioning, for example during a short circuit of a phase.

Four different curves are plotted, which represent different rotor pole numbers 210-$n$ of the rotor 208. These four curves are intersected by the dotted straight line of the maximum brake torque $M_{BTMAX}$ parallel to the abscissa. Respective parallels to the ordinate through these intersection points in each case indicate on the abscissa an associated diameter/length ratio DLV1 . . . 4 of the rotor 208.

It has been found that the optimum diameter/length ratio DLV for a permanent magnet synchronous motor 200 with a rotor 208 with permanent magnets 204 arranged in a spoke-like manner according to FIGS. 2 and 3 depends on the rotor pole number 210-$n$, the rotor diameter D and the rotor length L.

Thus, for example, the optimum diameter/length ratio DLV for a rotor 208 with a rotor pole number 210-6 (n=6) of six rotor poles and a stator 201 with nine stator grooves 202 is greater than the numerical value DLV1=1.63.

The interconnections of the optimal diameter/length ratio DLV and the parameter rotor number 210-$n$ are clearly shown in Table 1 below.

TABLE 1

DLV and parameter rotor pole number 210-n

| No. | Rotor pole number 210-n | Number of stator grooves 202 | DLV |
| --- | --- | --- | --- |
| 1 | 6 | 9 | >1.63 |
| 2 | 8 | 12 | >1.55 |
| 3 | 10 | 12 | >1.50 |
| 4 | 14 | 12 | >1.42 |

It can thus be seen from these test results that the permanent magnet synchronous motor 200 according to the invention with a brake torque, which is smaller than the maximum brake torque $M_{BTMAX}$, provides greater safety in relation to a conventional motor, in that in the event of a possible fault, for example in a power-assisted steering system, the steering is not blocked by a brake torque that is too high.

In addition to the diameter/length ratio DLV, the following parameter has to be adhered to. This further parameter is the rotor packet number 209-$n$ of small rotor packets. This is illustrated in Table 2.

TABLE 2

| | Rotor length and rotor packet number | |
|---|---|---|
| No. | Rotor length L (mm) | Rotor packet number 209-n |
| 1 | L ≤ 20 | 1 |
| 2 | 20 ≤ L ≤ 40 | 1 or 2 |
| 3 | 40 ≤ L ≤ 60 | 2 or 3 |
| 4 | 60 ≤ L ≤ 100 | 3 or 4 |

With an active axial rotor length L, which is less than 20 mm, a rotor packet number 209-$n$ with the value n=1 is necessary. A further example (3) shows that with a rotor length L in the range from 40 mm to 60 mm for the rotor packet number 209-$n$, the value n=2 or n=3 applies.

Moreover, Table 1 can be extended by the further parameter interconnection angle γ to Table 3 below.

TABLE 3

| | Interconnection angle γ | | | |
|---|---|---|---|---|
| No. | Rotor pole number 210-n | Number of stator grooves 202 | Interconnection angle γ (°) | DLV |
| 1 | 6 | 9 | 9 ± 2 | >1.63 |
| 2 | 8 | 12 | 7.5 ± 2 | >1.55 |
| 3 | 10 | 12 | 6 ± 2 | >1.50 |
| 4 | 14 | 12 | 2 ± 1 | >1.42 |

It can be seen that with an increasing rotor pole number 210-$n$, the diameter/length ratio DLV and also the interconnection angle γ reduces.

Although the present invention is described above using a preferred embodiment, it is not to be limited thereto, but can be modified in any desired manner without deviating from the subject matter of the present invention.

It is conceivable that the rotor packet number 209-$n$ has an n that is greater than in the embodiments shown.

The use of the permanent magnet synchronous motor 200 according to the invention in a power-assisted steering system 100 (FIG. 1) of a motor vehicle can not only take place on the steering gear 101 but also on the steering shaft 102, on the pinion 105 or else at a different point with corresponding couplings.

The use of the permanent magnet synchronous motor 200 according to the invention for a drive device in a motor vehicle and here, in particular, for a servo drive 103 of a power-assisted steering system 100 of a motor vehicle is also merely to be understood by way of example. Rather, the invention can be advantageously used in any electric drives.

The aforementioned numerical details are indeed preferred and sometimes taken from a specific application, but these may also be varied to a greater or lesser extent in accordance with expert action and knowledge.

LIST OF REFERENCE NUMERALS

100 power-assisted steering system
101 steering gear
102 steering shaft
103 servo drive
104 control unit
105 pinion
106 wheel
107 track rod
200 permanent magnet synchronous motor
201 stator
202 stator groove
203 rotor core
204 permanent magnet
205 rotor body
206 rotor shaft
207 rotor axis
208 rotor
209 rotor packet
209-$n$ rotor packet number
210-$n$ rotor pole number
300 star connection
301 star point
302 delta connection
DLV, DLV1 . . . 4 diameter/length ratios
D rotor diameter
L rotor length
MBT brake torque
N, S magnet poles
U, V, W terminals
γ Interconnection angle

The invention claimed is:

1. A permanent magnet synchronous motor, comprising:
   a stator including stator teeth with interposed stator grooves are arranged,
   at least one winding made of an electrically conductive material being provided on each stator tooth, and
   a rotor with permanent magnets that are arranged radially in a spoke-like manner in the rotor,
   wherein:
      the permanent magnet synchronous motor is configured with a predetermined and limited maximum brake torque, based on all parameters of a predetermined diameter/length ratio of the rotor, a rotor pole number, and a number of stator grooves, and
      the rotor has at least one rotor packet, wherein a rotor packet number depends on the rotor length in accordance with the following table:

| Rotor length L (mm) | Rotor packet number 209-n |
|---|---|
| L ≤ 20 | 1 |
| 20 ≤ L ≤ 40 | 1 or 2 |
| 40 ≤ L ≤ 60 | 2 or 3 |
| 60 ≤ L ≤ 100 | 3 or 4. |

2. The motor of claim 1, wherein the permanent magnet synchronous motor has nine stator grooves or twelve stator grooves and the rotor pole number of the rotor is six, eight, ten or fourteen.

3. The motor of claim 1, wherein the predetermined diameter/length ratio of the rotor, the rotor pole number and the number of stator grooves are related in accordance with the following table:

| Rotor pole number 210-n | Number of stator grooves 202 | diameter/length ratio |
|---|---|---|
| 6 | 9 | >1.63 |
| 8 | 12 | >1.55 |
| 10 | 12 | >1.50 |
| 14 | 12 | >1.42. |

4. The motor of claim 1, wherein when a rotor packet number is greater than one, the rotor packets are arranged rotated in relation to one another by an interconnection angle about a rotor axis.

5. The motor of claim 4, wherein the interconnection angle depends on the diameter/length ratio of the rotor in accordance with the following table:

| Rotor pole number 210-n | Number of stator grooves 202 | Interconnection angle γ (°) | diameter/ length ratio |
|---|---|---|---|
| 6 | 9 | 9 ± 2 | >1.63 |
| 8 | 12 | 7.5 ± 2 | >1.55 |
| 10 | 12 | 6 ± 2 | >1.50 |
| 14 | 12 | 2 ± 1 | >1.42. |

6. The motor of claim 1, wherein the stator has three-phase windings in a delta connection.

7. The motor of claim 1, wherein the stator has three-phase windings in a star connection.

8. The motor of claim 1, wherein the permanent magnets of the rotor contain ferrite magnets or/and materials made of rare earths.

9. The motor of claim 1, wherein the permanent magnet synchronous motor is a three-phase electric motor.

10. An electric power-assisted steering system of a motor vehicle including at least one permanent magnet synchronous motor, the at least one permanent magnet synchronous motor comprising:

a stator including stator teeth with interposed stator grooves are arranged, at least one winding made of an electrically conductive material being provided on each stator tooth, and a rotor with permanent magnets that are arranged radially in a spoke-like manner in the rotor, wherein:

the permanent magnet synchronous motor is configured with a predetermined and limited maximum brake torque, based on all parameters of a predetermined diameter/length ratio of the rotor, a rotor pole number, and a number of stator grooves, and the rotor has at least one rotor packet, wherein a rotor packet number depends on the rotor length in accordance with the following table:

| Rotor length L (mm) | Rotor packet number 209-n |
|---|---|
| L ≤ 20 | 1 |
| 20 ≤ L ≤ 40 | 1 or 2 |
| 40 ≤ L ≤ 60 | 2 or 3 |
| 60 ≤ L ≤ 100 | 3 or 4. |

* * * * *